United States Patent
Wang et al.

(10) Patent No.: US 10,182,457 B2
(45) Date of Patent: Jan. 15, 2019

(54) METHODS FOR TRANSMITTING AND RECEIVING PHYSICAL RANDOM ACCESS CHANNEL (PRACH), BASE STATION AND USER EQUIPMENT

(71) Applicant: SHARP KABUSHIKI KAISHA, Osaka-shi, Osaka (JP)

(72) Inventors: Feng Wang, Shanghai (CN); Renmao Liu, Shanghai (CN)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

(21) Appl. No.: 14/901,190

(22) PCT Filed: Jun. 26, 2014

(86) PCT No.: PCT/CN2014/080826
§ 371 (c)(1),
(2) Date: Dec. 28, 2015

(87) PCT Pub. No.: WO2014/206311
PCT Pub. Date: Dec. 31, 2014

(65) Prior Publication Data
US 2016/0150570 A1 May 26, 2016

(30) Foreign Application Priority Data

Jun. 27, 2013 (CN) .......................... 2013 1 0261358

(51) Int. Cl.
*H04W 74/08* (2009.01)
*H04W 52/02* (2009.01)
(Continued)

(52) U.S. Cl.
CPC ......... *H04W 74/0833* (2013.01); *H04W 4/70* (2018.02); *H04W 52/0216* (2013.01);
(Continued)

(58) Field of Classification Search
CPC ............. H04W 4/005; H04W 72/0413; H04W 74/0833
See application file for complete search history.

(56) References Cited

U.S. PATENT DOCUMENTS

2010/0278064 A1 11/2010 Jeong
2010/0296467 A1* 11/2010 Pelletier .............. H04W 74/002
370/329
(Continued)

FOREIGN PATENT DOCUMENTS

CN 102422568 A 4/2012
CN 102740407 A 10/2012
WO WO 2014067133 A1 * 5/2014 ........... H04B 17/309

OTHER PUBLICATIONS

3GPP TS 36.211 V10.5.0 (Jun. 2012); 3rd Generation Partnership Project; Technical Specification Group Radio Access Network; Evolved Universal Terrestrial Radio Access (E-UTRA); Physical Channels and Modulation (Release 10), pp. 1-101.
(Continued)

Primary Examiner — Scott M Sciacca
(74) Attorney, Agent, or Firm — Birch, Stewart, Kolasch & Birch, LLP (57) ABSTRACT

The present disclosure provides a method performed by a base station. The method comprises: generating and transmitting a Physical Random Access Channel (PRACH) configuration parameter for a User Equipment (UE); detecting a random preamble sequence and/or a corresponding PRACH resource set transmitted from the UE, so as to determine a type and/or a coverage enhancement level of the UE; and generating a Random Access Response (RAR) based on the type and/or the coverage enhancement level of the UE. The present disclosure also provides a method performed by a UE and correspondingly a base station and a UE. With the present disclosure, it is possible to increase
(Continued)

resource utilization for LTE to support MTC UEs, improve frequency spectrum/energy efficiency, and reduce time/frequency resource conflicts between cells.

8 Claims, 7 Drawing Sheets

(51) Int. Cl.
*H04W 4/70* (2018.01)
*H04W 28/18* (2009.01)
*H04W 74/00* (2009.01)
*H04W 88/08* (2009.01)

(52) U.S. Cl.
CPC ... *H04W 52/0219* (2013.01); *H04W 52/0229* (2013.01); *H04W 74/08* (2013.01); *H04W 28/18* (2013.01); *H04W 74/002* (2013.01); *H04W 88/08* (2013.01); *Y02D 70/00* (2018.01); *Y02D 70/1262* (2018.01); *Y02D 70/1264* (2018.01); *Y02D 70/21* (2018.01)

(56) References Cited

U.S. PATENT DOCUMENTS

| | | | |
|---|---|---|---|
| 2010/0331003 A1* | 12/2010 | Park | H04W 74/0833 455/450 |
| 2011/0261841 A1* | 10/2011 | Lee | H04B 7/068 370/474 |
| 2011/0287776 A1* | 11/2011 | Vujcic | H04W 72/048 455/452.1 |
| 2013/0114515 A1* | 5/2013 | Koo | H04J 11/0023 370/329 |
| 2013/0242730 A1* | 9/2013 | Pelletier | H04W 28/0284 370/230 |
| 2014/0098761 A1* | 4/2014 | Lee | H04W 74/006 370/329 |
| 2014/0219152 A1* | 8/2014 | Anto | H04W 52/08 370/311 |
| 2015/0103761 A1* | 4/2015 | Chen | H04W 74/0833 370/329 |
| 2015/0173105 A1* | 6/2015 | Bergstrom | H04W 74/006 370/329 |
| 2015/0236932 A1* | 8/2015 | Yu | H04L 43/0835 370/252 |
| 2015/0365976 A1* | 12/2015 | Lee | H04W 74/0833 455/422.1 |
| 2015/0373740 A1* | 12/2015 | Eriksson | H04W 74/0833 370/329 |
| 2016/0127918 A1* | 5/2016 | Yi | H04W 84/047 370/329 |

OTHER PUBLICATIONS

3GPP TS 36.331 V11.2.0 (Dec. 2012); 3rd Generation Partnership Project; Technical Specification Group Radio Access Network; Evolved Universal Terrestrial Radio Access (E-UTRA); Radio Resource Control (RRC); Protocol specification (Release 11), pp. 1-340.

Huawei, HiSilicon, "Considerations on Acquiring the Amount of Coverage Improvement for Low-Cost MTC UEs", 3GPP TSG-RAN WG1#73 R1-132410, May 24, 2013, URL:http://www.3gpp.org/ftp/tsg_ran/WG1_RL1/TSGR1_73/Docs/R1-132410.zip

MediaTek Inc., "On Required System Functionalities for MTC UEs Operating in Enhanced Coverage Mode", 3GPP TSG-RAN WG1#72 R1-130218, Feb. 1, 2013, URL:http://www.3gpp.org/ftp/tsg_ran/WG1_RL1/TSGR1_72/Docs/R1-130218.zip.

NTT DOCOMO, "Path Loss Measurements in Carrier Aggregation", 3GPP TSG-RAN WG4#55 R4-102214, May 14, 2010, URL:http://www.3gpp.org/ftp/tsg_ran/WG4_Radio/TSGR4_55/Documents/R4-102214.zip.

* cited by examiner

METHODS FOR TRANSMITTING AND RECEIVING PHYSICAL RANDOM ACCESS CHANNEL (PRACH), BASE STATION AND USER EQUIPMENT

TECHNICAL FIELD

The present disclosure relates to wireless communication technology, and more particularly, to a method for transmitting/receiving Physical Random Access Channel (PRACH) of a serving cell, a base station and a user equipment.

BACKGROUND

The Long Term Evolution (LTE) system deployed by the $3^{rd}$ Generation Partner Project (3GPP) is intended to provide increasingly diversified mobile communication services in the future. Wireless cellular communications have become an essential part of people's lives and work. User terminals have also become more and more diversified. In the first release (Release 8) of the 3GPP LTE, Orthogonal Frequency Division Multiple Access (OFDMA) and Multiple Input Multiple Output (MIMO) techniques have been introduced. After evaluation and test by International Telecommunication Union (ITU), the 3GPP Release 10 has been established as the $4^{th}$ generation global mobile communication standard, known as LTE-Advanced. In the LTE-Advanced standard, Carrier Aggregation (CA) and relay techniques have been introduced to improve uplink (UL)/downlink (DL) MIMO technique while supporting heterogeneous network (HetNet) deployment.

In order to meet the market demand on home device communications and the deployment of a huge-scale Internet of Things (IoT) in the future, the 3GPP has decided to introduce a low-cost Machine Type Communication (MTC) technique in the LTE and its further evolution, to transfer MTC services from the current GSM network to the LTE network and define a new type of User Equipment (UE), referred to as Low-cost MTC UE. Such UE can support MTC services in all duplex modes in the current LTE network and has: 1) one single receiving antenna; 2) a maximum Transport Block Size (TBS) of 1000 bits in UL/DL; and 3) a reduced baseband bandwidth of DL data channel of 1.4 MHz, a bandwidth of DL control channel identical to the system bandwidth of the network layer, and the same UL channel bandwidth and DL Radio Frequency (RF) part as UEs in the current LTE network. The MTC is a data communication service without human involvement. A large-scale deployment of MTC UEs can be applied to various fields such as security, tracking, payment, measurement, consumer electronics, and in particular to applications such as video surveillance, supply chain tracking, intelligent metering and remote monitoring. The MTC requires low power consumption and supports low data transmission rate and low mobility. Currently, the LTE system is mainly designed for Human-to-Human (H2H) communication services. Hence, in order to achieve the scale benefit and application prospect of the MTC services, it is important for the LTE network to support the low-cost MTC devices to operate at low cost.

Some MTC devices are mounted in basements of residential buildings or locations protected by insulating films, metal windows or thick walls of traditional buildings. These devices will suffer significantly higher penetration loss in air interface than conventional device terminals, such as mobile phones and tablets, in the LTE network. The 3GGP has started researches on solution designs and performance evaluations for the LTE network to provide the MTC devices with a 20 dB of additional coverage enhancement. It is to be noted that an MTC device located in an area with poor network coverage has a very low data transmission rate, a very loose delay requirement and a very limited mobility. For these MTC characteristics, some signaling and/or channels of the LTE network can be further optimized to support the MTC. The 3GPP requires providing the newly defined low cost UEs and other UEs running MTC services (e.g., with very loose delay requirements) with a certain level of LTE network coverage enhancement. In particular, a 15dB of network coverage enhancement is provided in the LTE Frequency Division Duplex (FDD) network. Additionally, not all UEs running MTC services need the same network coverage enhancement.

In LTE, PRACH provides UL timing synchronization, i.e., a Random Access (RA) procedure, for UEs that have not reached UL synchronization or have lost UL synchronization. Once the UL synchronization has completed, the base station network can schedule UL orthogonal synchronized resources for the UEs. Thus, the LTE PRACH plays an important role as an interface between unsynchronized UEs and LTE UL radio access. The LTE provides two RA procedures: "contention-based" access and "non-contention" access. In a contention-based RA procedure, a UE randomly selects an RA preamble signature based on the received PRACH resource configuration parameters, resulting in a possibility that more than one UE transmits the same signature simultaneously over the same PRACH. This needs to be followed by a contention resolution solution. For the non-contention access, the LTE network allocates UE-specific signature sequences for contention avoidance, which is very important for handover situations with time constraints.

There have been various proposals regarding the minimum transmission bandwidth of PRACH during the LTE research. One proposal is to set the minimum bandwidth of PRACH to the smallest resource allocation element in frequency domain in the system, i.e., 180 KHz (Resource Block (RB) bandwidth). Another proposal is to set the minimum bandwidth of PRACH to the minimum system bandwidth supported by the LTE, i.e., 1.25 MHz. After discussion, the 3GPP has decided to use a fixed, 1.25 MHz of PRACH transmission bandwidth. When higher access probability is desired, more than one 1.25 MHz bandwidth (the effective PRACH bandwidth is actually 6 RBs, i.e., 1.08 MHz) can be configured. The PRACH allows multiplexing PUCCH and PUSCH in frequency domain. The time domain structure of the PRACH is dependent on two variables: RA timeslot length and period of. The RA timeslot length has been determined as the length of one subframe, i.e., 1 ms. The position of the subframe where the RA timeslot is located is dependent on the transmission period of the RA timeslot and the number of the subframe where the RA timeslot is located. The specific position of the RA timeslot in frequency domain has been determined as one of two possible positions adjacent to PUCCH. The PRACH preamble sequence is a ZC sequence having a length of 839. The total number of ZC sequences depends on the length of the ZC sequence. The 839 ZC sequences are allocated among a number of cells and different ZC sequences are used in neighboring cells to effectively suppress interference between PRACHs of different cells. Four PRACH preamble sequence formats have been defined in the LTE TDD system, each of which is defined by a sequence duration and a Cyclic Prefix (CP).

Conventional design structure and configuration of PRACH cannot meet the requirement of some MTC devices on the 20dB of additional coverage enhancement. Hence, for those MTC devices requiring the 20dB of additional coverage enhancement (the LTE FDD network provides a 15 dB of coverage enhancement), the conventional PRACH needs to be re-designed or improved. According to the current progress and future trend of the 3GPP discussions, the PRACH coverage enhancement can be achieved mainly by: 1) repeating the PRACH preamble sequence or re-designing the preamble sequence; 2) relaxing the requirements on PRACH detection probability and PRACH delay; or 3) enhancing power spectral density. Further, it has been decided by the 3GPP discussions that the PRACH can be used for a UE running an MTC service to notify an LTE base station of the coverage enhancement it requires. It is to be noted here that the coverage enhancement comes at expense of time-frequency resources and power of the LTE network and not all the MTC devices require the same amount of coverage enhancement. From the perspective of resource utilization, an MTC device shall use as few time-frequency resources as possible for RA so as to meet the coverage enhancement requirement. Therefore, in view of the low cost requirement of the MTC devices and the characteristics of the MTC services, there is a problem regarding how the LTE network can provide the PRACH coverage enhancement efficiently. There is also a problem regarding how the MTC device can use the PRACH to notify the base station of the amount of coverage enhancement.

SUMMARY

In order to solve the above problems, the present disclosure provides a PRACH transmission mechanism for an MTC UE (including low-cost UE and other UEs running delay-tolerant MTC services and requiring a certain amount of network coverage enhancement) based on the LTE network. According to the present disclosure, in the contention-based RA procedure in the current LTE network, the LTE network configures a PRACH parameter. The MTC UE selects a corresponding preamble sequence and a PRACH resource for RA attempt. The LTE network learns a type of the UE and/or a required amount of coverage enhancement based on a detected sequence signature and/or a corresponding PRACH resource.

In an aspect of the present disclosure, a method performed by a base station is provided. The method comprises: generating and transmitting a Physical Random Access Channel (PRACH) configuration parameter for a User Equipment (UE); detecting a random preamble sequence and/or a corresponding PRACH resource set transmitted from the UE, so as to determine a type and/or a coverage enhancement level of the UE; and generating a Random Access Response (RAR) based on the type and/or the coverage enhancement level of the UE.

Preferably, the PRACH configuration parameter for the UE is broadcast over a physical layer broadcast channel in a serving cell.

Preferably, the PRACH configuration parameter for the UE is transmitted in system information in accordance with a PRACH-ConfigSIB specification, or in mobility control information in accordance with a PRACH-Config specification.

Preferably, the PRACH configuration parameter for the UE is transmitted in a System Information Block (SIB) or a Layer 2/Layer 3 message.

Preferably, the PRACH configuration parameter for the UE comprises one or more of: a basic parameter for a PRACH preamble sequence, a random access scheme, a coverage enhancement level configuration of a cell, duration periods of PRACH resource sets required for UEs having different coverage enhance levels, a PRACH element configuration in the PRACH resource set, and a time window for the UE to detect the RAR.

Preferably, the type and/or the coverage enhancement level of the UE are determined by detecting the random access preamble sequence transmitted from the UE in a pre-defined and/or pre-configured PRACH resource, wherein the PRACH resource set corresponds to the coverage enhancement level of UE uniquely.

Preferably, the type and/or the coverage enhancement level of the UE are determined by detecting a random access preamble signature of the UE, wherein the random access preamble signature of the UE corresponds to the coverage enhancement level of the UE.

Preferably, the RAR comprises one or more of: an uplink synchronization timing adjustment, a cell radio network temporary identifier and a Layer 2/Layer 3 uplink message grant.

According to another aspect of the present disclosure, a method performed by a User Equipment (UE) is provided. The method comprises: receiving a Physical Random Access Channel (PRACH) configuration parameter; calculating a coverage enhancement level of the UE; and selecting a PRACH resource set and a random access preamble sequence for random access.

Preferably, the UE obtains from the PRACH configuration parameter a unique correspondence between the coverage enhancement level and a path loss, a UE measurement or a coverage enhancement level associated with a previous successful access, and calculating the coverage enhancement level of the UE based on the path loss, the UE measurement or the coverage enhancement level associated with the previous successful access.

Preferably, the UE selects a random access preamble sequence based on the calculated coverage enhancement level and transmits the random access preamble sequence over the PRACH resource set corresponding to the calculated coverage enhancement level.

Preferably, the UE selects a preamble sequence from preamble sequences for non-contention random access randomly and reuses the PRACH resource set corresponding to the preamble sequence.

Preferably, the UE uses all or part of existing PRACH preamble sequences and uses an independent PRACH resource set, wherein the PRACH resource set of the UE does not conflict with any existing PRACH resource, existing reference signal or other existing channel.

Preferably, the PRACH resource set includes N PRACH elements, where N is a positive integer.

Preferably, the PRACH elements are transmitted in a frequency hopping manner.

Preferably, each PRACH element has a fixed position in frequency domain.

Preferably, a plurality of PRACH resource sets for the UE have the same duration period.

Preferably, a plurality of PRACH resource sets for the UE have different duration periods.

Preferably, a plurality of PRACH resource sets for the UE have a nested format.

According to another aspect of the present disclosure, a base station is provided. The base station comprises: a parameter generating unit configured to generate and transmit a Physical Random Access Channel (PRACH) configuration parameter for a User Equipment (UE); a detecting unit configured to detect a random preamble sequence and/or a corresponding PRACH resource set transmitted from the UE, so as to determine a type and/or a coverage enhancement level of the UE; and a responding unit configured to generate a Random Access Response (RAR) based on the type and/or the coverage enhancement level of the UE.

Preferably, the parameter generating unit is configured to broadcast the PRACH configuration parameter for the UE over a physical layer broadcast channel in a serving cell.

Preferably, the parameter generating unit is configured to transmit the PRACH configuration parameter for the UE in system information in accordance with a PRACH-Config-SIB specification, or in mobility control information in accordance with a PRACH-Config specification.

Preferably, the parameter generating unit is configured to transmit the PRACH configuration parameter for the UE in a System Information Block (SIB) or a Layer 2/Layer 3 message.

Preferably, the PRACH configuration parameter for the UE comprises one or more of: a basic parameter for a PRACH preamble sequence, a random access scheme, a coverage enhancement level configuration of a cell, duration periods of PRACH resource sets required for UEs having different coverage enhance levels, a PRACH element configuration in the PRACH resource set, and a time window for the UE to detect the RAR.

Preferably, the detecting unit is configured to determine the type and/or the coverage enhancement level of the UE by detecting the random access preamble sequence transmitted from the UE in a pre-defined and/or pre-configured PRACH resource, wherein the PRACH resource set corresponds to the coverage enhancement level of UE uniquely.

Preferably, the detecting unit is configured to determine the type and/or the coverage enhancement level of the UE by detecting a random access preamble signature of the UE, wherein the random access preamble signature of the UE corresponds to the coverage enhancement level of the UE.

According to another aspect of the present disclosure, a User Equipment (UE) is provided. The UE comprises: a parameter receiving unit configured to receive a Physical Random Access Channel (PRACH) configuration parameter; a calculating unit configured to calculate a coverage enhancement level of the UE; and an accessing unit configured to select a PRACH resource set and a random access preamble sequence for random access.

Preferably, the calculating unit is configured to obtain from the PRACH configuration parameter a unique correspondence between the coverage enhancement level and a path loss and calculate the coverage enhancement level of the UE based on the path loss.

Preferably, the accessing unit is configured to select a random access preamble sequence based on the calculated coverage enhancement level and transmit the random access preamble sequence over the PRACH resource set corresponding to the calculated coverage enhancement level.

Preferably, the accessing unit is configured to select a preamble sequence from preamble sequences for non-contention random access randomly and reuse the PRACH resource set corresponding to the preamble sequence.

With the mechanisms for transmitting the RA procedure information for the MTC UE in the serving cell according to the present disclosure, it is possible to allow the base station to transmit the RA procedure information for the serving cell and to allow the MTC UE to select the corresponding PRACH resource for RA. With the solutions according to the present disclosure, it is possible to increase resource utilization for LTE to support MTC UEs, improve frequency spectrum/energy efficiency, and reduce time/frequency resource conflicts between cells.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure (in particular, a method for transmitting/receiving PRACH, a base station and a UE for low cost UEs that may or may not require additional coverage enhancement or other UEs that support delay-tolerant MTC services and require a certain amount of coverage enhancement) will be detailed below with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1A:
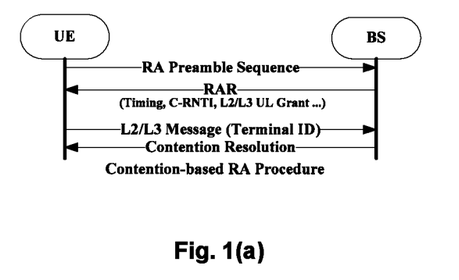
FIGS. 1(a) and 1(b) are schematic diagrams showing an RA procedure in the LTE network.
Figure 1B:
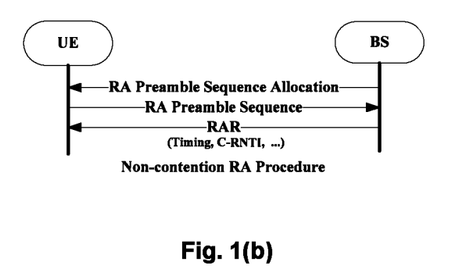

FIGS. 1(a) and 1(b) show two modes of RA procedures in the LTE network: contention-based RA and non-contention-based RA. A UE randomly selects an RA preamble sequence signature in the following scenarios: 1) when the UE is in RRC_CONNECTED state but has not reached UL synchronization, it needs to transmit new UL data and control information (e.g., an event-triggered measurement report); 2) when the UE is in RRC_CONNECTED state but has not reached UL synchronization, it needs to receive a new DL data and thus to transmit ACK/NACK as response in UL; 3) when the UE is in RRC_CONNECTED state, it is being handed over from its serving cell to a target cell; 4) the UE is switched from RRC_IDLE state to RRC_CONNECTED state, e.g., at initial access or track area update; and 5) when the UE recovers from a radio link failure state, the UE is initialized for contention-based RA procedure. As a result, it is possible that a number of UEs may transmit the preamble sequences having the same signature simultaneously, which requires a subsequent contention resolution procedure. For the scenarios 2) (new DL data) and 3) (handover), the base station can avoid the contention by assigning UE-specific preamble sequence signatures for the UEs. Such non-contention-based RA is faster than the contention-based RA, so as to avoid the impact of unpredictable delay. Due to the characteristics of the MTC UEs, such as limited mobility, very low data transmission rate and loose delay requirement, it is preferred to configure the MTC UEs to perform the contention-based RA procedure. It is thus desired to design the preamble sequences for RA to be selected by the MTC UEs and the time-frequency resources (i.e., PRACH) required for transmitting these sequences.

Figure 9:
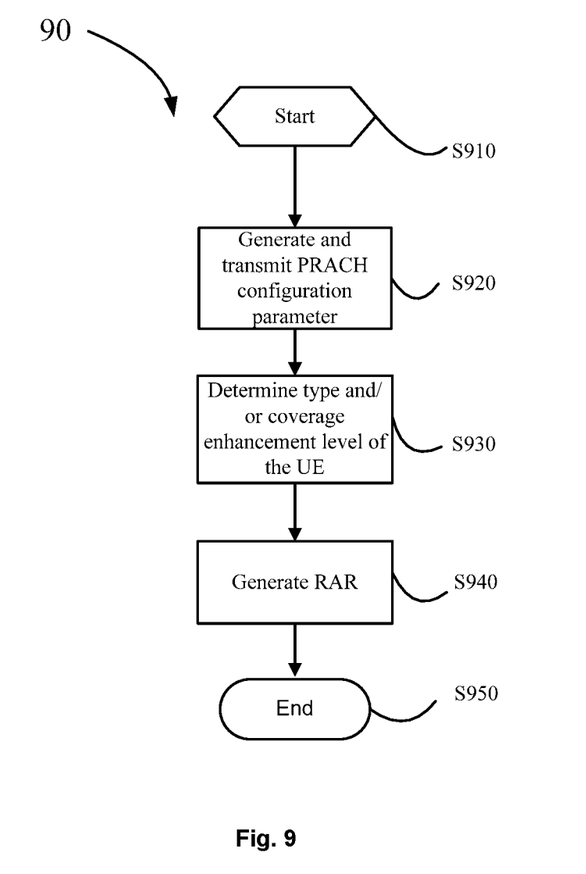
FIG. 9 is a flowchart illustrating a method for transmitting PRACH according to an embodiment of the present disclosure.

FIG. 9 is a flowchart illustrating a method for transmitting PRACH according to an embodiment of the present disclosure. The method can be performed by a base station. As shown in FIG. 9, the method 90 starts with S910.

At step S920, a PRACH configuration parameter for a UE can be generated and transmitted. In the LTE network, the PRACH configuration parameter for an MTC UE can be generated and transmitted according to one of Examples 1-4 as described below.

Example 1: The base station can broadcast the RA configuration information for low cost MTC UEs that may or may not require additional coverage enhancement or other UEs that run delay-tolerant MTC services and require coverage enhancement over a physical layer broadcast channel in a serving cell. For example, a Physical Broadcast Channel (PBCH) can be re-designed for an MTC UE that requires additional coverage enhancement to transmit basic system information (e.g., system frame number) and configuration information for MTC UEs that may or may not require additional coverage enhancement or other UEs that run delay-tolerant MTC services and require coverage enhancement, including PRACH preamble sequence parameter, transmission format, frequency domain position, timeslot period, RAR receiving time window, etc.

Example 2: The base station transmits the PRACH configuration parameter in system information in accordance with a PRACH-ConfigSIB specification, or in mobility control information in accordance with a PRACH-Config specification. The MTC UE reads the PRACH-ConfigSIB and/or the PRACH-Config to obtain the RA configuration information. 3GPP TS 36.331 V11.2.0 states:

```
PRACH-ConfigSIB ::=    SEQENCE{
  rootSequenceIndex      INTEGER {0...837},
  prach-ConfigInfo       PRACH-ConfigInfo
}
PRACH-Config ::=       SEQENCE{
  rootSequenceIndex      INTEGER {0...837},
  prach-ConfigInfo       PRACH-ConfigInfo   OPTIONAL -Need ON
}
```

```
PRACH-ConfigSCell-r10 ::=    SEQUENCE{
  Prach-ConfigIndex-r10      INTERGE {0...63}
}
PRACH-ConfigInfo ::= SEQUENCE{
  prach-ConfigIndex            INTEGER {0...63},
  highSpeedFlag                BOOLEAN,
  zeroCorrelationZoneConfig    INTEGER{0...15},
  prach-FreqOffset             INTEGER{0...94}
}
```

Example 3: The base station transmits the RA configuration information for the MTC UE in a System Information Block (SIB) or a modified PRACH-ConfigSIB and/or PRACH-Config (Layer 2/Layer 3 message). For example, the following modification is proposed for 3GPP TS 36.211 V10.5.0:

For PRACH for low cost MTC UEs that do not require additional coverage enhancement, the RA preamble sequence and/or the RA preamble sequence format can be fixed or re-designed.

For PRACH for MTC UEs that require additional coverage enhancement (including those running delay-tolerant MTC services and requiring coverage enhancement), the RA preamble sequence format can be fixed or re-designed. For example, in the radio frame structure 1 (FDD), the existing preamble sequence format 2 can be used.

A PRACH configuration index (i.e., prach-ConfigurationIndex) is provided for indicating the position of the PRACH resource in a radio frame and numbering UL resources in advance. Here, the parameter prach-ConfigurationIndex is provided in PRACH-ConfigIndex by higher layer signaling. For example, Table 5.7.1-2 in 3GPP TS36.211 V10.5.0 can be modified for selecting PRACH configurations applicable for MTC UEs, which are renumbered as MTC-prach-ConfigurationIndex 0~13, as shown in the table below:

TABLE 1

| MTC PRACH Configuration Index | PRACH Configuration Index | RA Preamble Format | System Frame No. | Sub-frame No. |
|---|---|---|---|---|
| 0 | 32 | 2 | even | 1 |
| 1 | 33 | 2 | even | 4 |
| 2 | 34 | 2 | even | 7 |
| 3 | 35 | 2 | arbitrary | 1 |
| 4 | 36 | 2 | arbitrary | 4 |
| 5 | 37 | 2 | arbitrary | 7 |
| 6 | 38 | 2 | arbitrary | 1, 6 |
| 7 | 39 | 2 | arbitrary | 2, 7 |
| 8 | 40 | 2 | arbitrary | 3, 8 |
| 9 | 41 | 2 | arbitrary | 1, 4, 7 |
| 10 | 42 | 2 | arbitrary | 2, 5, 8 |
| 11 | 43 | 2 | arbitrary | 3, 6, 9 |
| 12 | 44 | 2 | arbitrary | 0, 2, 4, 6, 8 |
| 13 | 45 | 2 | arbitrary | 1, 3, 5, 7, 9 |

Alternatively, MTC-prach-ConfigurationIndex can be further simplified to select the indices 38~45, which are renumbered as 0~7, as shown in the table below:

TABLE 2

| MTC PRACH Configuration Index | PRACH Configuration Index | RA Preamble Format | System Frame No. | Sub-frame No. |
|---|---|---|---|---|
| 0 | 38 | 2 | arbitrary | 1, 6 |
| 1 | 39 | 2 | arbitrary | 2, 7 |
| 2 | 40 | 2 | arbitrary | 3, 8 |

TABLE 2-continued

| MTC PRACH Configuration Index | PRACH Configuration Index | RA Preamble Format | System Frame No. | Sub-frame No. |
|---|---|---|---|---|
| 3 | 41 | 2 | arbitrary | 1, 4, 7 |
| 4 | 42 | 2 | arbitrary | 2, 5, 8 |
| 5 | 43 | 2 | arbitrary | 3, 6, 9 |
| 6 | 44 | 2 | arbitrary | 0, 2, 4, 6, 8 |
| 7 | 45 | 2 | arbitrary | 1, 3, 5, 7, 9 |

For low cost MTC UEs that do not require additional coverage enhancement, the size of time-frequency resource required for PRACH is defined as for the existing LTE UEs.

For MTC UEs that require additional coverage enhancement (including those running delay-tolerant MTC services and requiring coverage enhancement), the currently defined RA Physical Resource Block (PRB) $n_{PRB}^{RA}$ is reused. $n_{PRB}^{RA}$ represents the first PRB allocated to a PRACH (which occupies a bandwidth of six PRBs and has a time domain duration of 2 frames). Define $n_{PRB}^{RA} = n_{PRB\ offset}^{RA}$, where $n_{PRB\ offset}^{RA}$ is given by the parameter prach-FrequencyOffset, configured by higher signaling prach-FreqOffset, and satisfies $0 \leq n_{PRB\ offset}^{RA} \leq N_{RB}^{UL}$.

An RA parameter $t_x^{RB}$ is added, which represents a RA transmission duration for a coverage enhancement level of $CE_x$, where x=1, . . . , M and M denotes the total number of coverage enhance levels in the system. The parameter $t_x^{RA}$ is configured by higher signaling PRACH-ConfigInfo.

The PRACH-ConfigInfo in 3GPP TS36.331 V11.2.0 can be modified as follows:

```
PRACH-ConfigInfo ::= SEQUENCE{
prach-ConfigIndex            MTC-prach-ConfigIndex,
zeroCorrelationZoneConfig    INTEGER{0...15},
prach-FreqOffset             INTEGER{0...94}
}
PRACH-ConfigMTC-r12 ::= SEQUENCE{
MTC-prach-ConfigIndexMTC     INTEGER{0...7},
prach-CoverEnhLevelMTC       INTEGER {1...M},
prach-FirstStartSubframeMTC      INTEGER{0...9}
}
```

Example 4: The RA configuration information for all low cost MTC UEs can be preconfigured at manufacture.

In the present disclosure, the PRACH configuration parameter for the UE can include: a basic parameter for a PRACH preamble sequence (e.g., root sequence index, configuration index and format, cyclic shift, zero correlation region configuration, etc.), a random access scheme (e.g., contention-based RA or non-contention-based RA), a coverage enhancement level configuration of an entire cell, duration periods of PRACH resource sets required for MTC UEs having different coverage enhance levels, a PRACH element configuration in the PRACH resource set, and a time window for the MTC UE to detect the RAR.

At step S930, a random preamble sequence and/or a corresponding PRACH resource set transmitted from the UE is/are detected, so as to determine a type and/or a coverage enhancement level of the UE. Preferably, the coverage enhancement level of the UE can be determined by detecting the random access preamble sequence transmitted from the UE in a candidate PRACH resource set. Here the PRACH resource set corresponds to the coverage enhancement level of UE uniquely. Further, the coverage enhancement level of the UE can be determined by detecting a random access preamble signature of the UE. Here the random access preamble signature of the UE corresponds to the coverage enhancement level of the UE.

At step S940, a Random Access Response (RAR) is generated based on the type and/or the coverage enhancement level of the UE. Preferably, the RAR includes an uplink synchronization timing adjustment, a cell radio network temporary identifier and a Layer 2/Layer 3 uplink message grant, etc.

Finally, the method 90 ends at S950.

Figure 10:
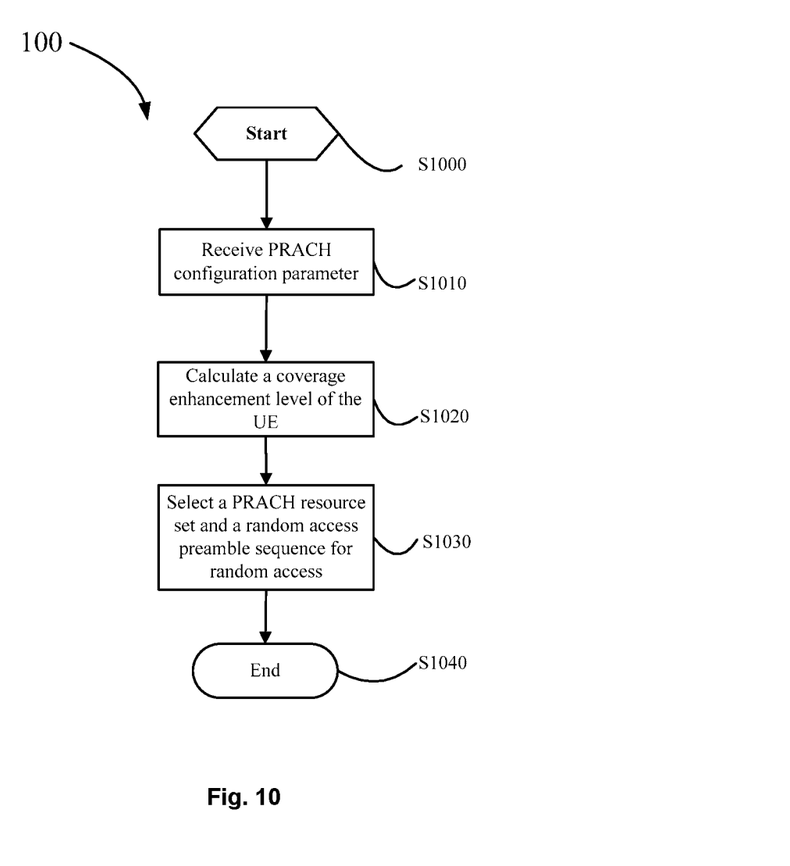
FIG. 10 is a flowchart illustrating a method for receiving PRACH according to an embodiment of the present disclosure.

FIG. 10 is a flowchart illustrating a method for receiving PRACH according to an embodiment of the present disclosure. The method can be performed by a UE. As shown in FIG. 10, the method 100 starts with S1000.

At step S1010, a Physical Random Access Channel (PRACH) configuration parameter is received.

At step S1020, a coverage enhancement level of the UE is calculated. In the LTE network, the coverage enhancement level of an MTC UE that requires additional coverage enhancement (including a low cost MTC UE or other UE running delay-tolerant MTC services and requiring coverage enhancement) can be determined in accordance with one of Examples 1~2 as described below.

Example 1: A unique correspondence between the coverage enhancement level $CE_x$ and a path loss $PL_x$ or UE measurement of a DL signal the can be defined, where x=1, . . . , M. This correspondence is included in the RA configuration information for the MTC UE and provided by the base station to the MTC UEs in the cell. Alternatively, it can be preconfigured for a low cost MTC UE at manufacture. The path loss or UE measurement $PL_x$ can be used as a positive reference of coverage enhancement. That is, an MTC UE experiencing a high path loss may have a high coverage level. The path loss can be calculated by reusing the existing mechanism in LTE. The UE can measure a Reference Signal Received Power (RSRP) of a Cell-specific Reference Signal (CRS) in DL. Given the CRS transmission power, the UE can estimate the path loss based on the average RSRP measurement and thus obtain information on the required coverage enhancement.

Example 2: The RA information of an MTC UE, including the RA preamble sequence to be used, the PRACH resource to be used, the PRACH timeslot period and the like, can be preconfigured at deployment of the MTC UE.

At step S1030, a PRACH resource set and a random access preamble sequence are selected for random access. For example, in the LTE network, the RA preamble sequence and the corresponding PRACH resource can be selected for the MTC UE in accordance with one of Examples 1~2 as described below.

Figure 2:
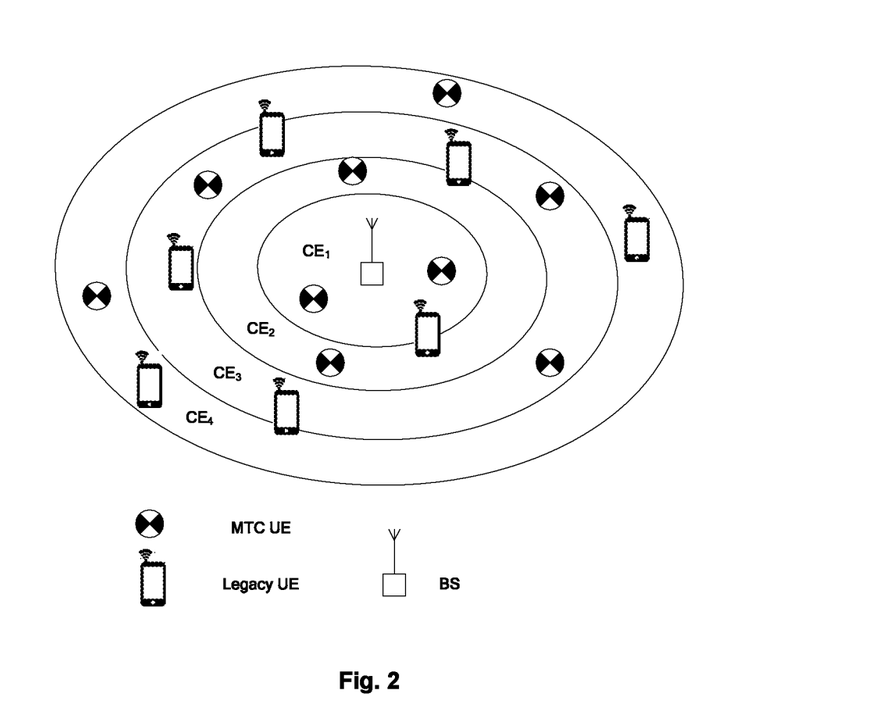
FIG. 2 is a schematic diagram showing a location distribution of MTC UEs in an LTE cell.
Figure 3:
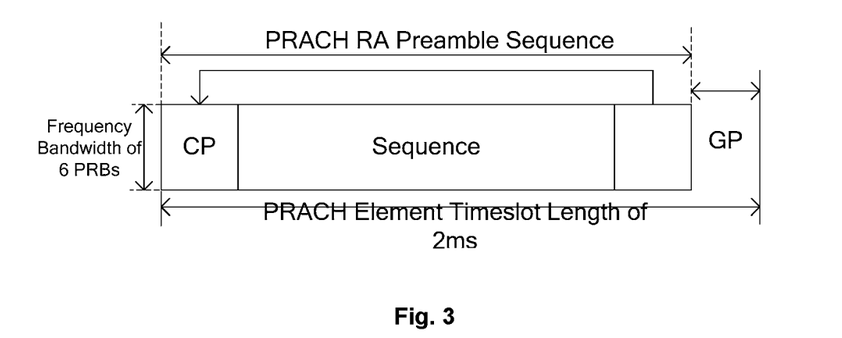
FIG. 3 is a schematic diagram showing a PRACH element for an MTC UE.

Example 1: In a serving cell, for an MTC UE that requires additional coverage enhancement (including a low cost MTC UE or other UE running delay-tolerant MTC services and requiring coverage enhancement), a preamble sequence can be selected randomly from preamble sequences for non-contention-based random access in the LTE network for the RA procedure and the PRACH resource set corresponding to the preamble sequence can be reused. In this case, the MTC UE requires different numbers of PRACH repetitions for different channel fading scenarios. In particular, a number of sequences can be selected from the preamble sequences for non-contention-based RA and divided into a number of groups each used for contention-based or non-contention-based RA for a MTC UE at a particular coverage enhancement level. A PRACH element is defined to have a frequency domain width of six RBs and a duration of two radio frames. In this case, the number of PRACH elements required by an MTC UE at the coverage enhancement level of $CE_x$ for RA attempt is $N_x$, where x=1, ..., M and M is the number of all possible coverage levels for MTC UEs in a network cell. FIG. 2 shows a distribution of MTC UEs in an LTE cell. The cell is divided into M=4 coverage enhancement level regions, $CE_1$, ..., $CE_4$. Accordingly, four groups of PRACH preamble sequences are required. Here, the MTC UEs at the edge of the cell experience the most significant channel fading, and this region has the highest coverage enhancement level and requires the highest amount of PRACH resources. For an MTC UE that does not require coverage enhancement, a number of sequences can be selected from preamble sequences for contention-based random access in the LTE network for the contention-based RA procedure and the PRACH resource corresponding to the preamble sequence can be reused.

Example 2: In a serving cell, all or part of existing PRACH preamble sequences in LTE can be used for all MTC UEs (including those requiring coverage enhancement and those not requiring coverage enhancement) for contention-based RRA procedure. Independent PRACH time-frequency resources can be configured for the MTC UEs. Here, the PRACH resource for the low cost UE does not conflict with any existing PRACH resource, any existing reference signal or any other existing channel. For an MTC UE that requires additional coverage enhancement (including a low cost MTC UE or other UE running delay-tolerant MTC services and requiring coverage enhancement), the PRACH element is defined, as in Example 1, to have a bandwidth of six RBs and a duration of two radio frames. A number of PRACH elements are configured in a UL radio frame for RA of the MTC UE. Here, an MTC UE having a coverage enhancement level of $CE_x$ can select $N_x$ PRACH elements for RA attempt, where x=1, ..., M and M denotes the number of all possible coverage levels for MTC UEs in a network cell. As shown in FIG. 2, a cell is divided into four coverage enhance regions for MTC UEs and the MTC UEs in different regions may require different PRACH resources.

Further, in the LTE network, an MTC UE that requires coverage enhancement can notify the base station of information on its required coverage enhancement (e.g., its coverage enhancement level $CE_x$) in accordance with one of Examples 1~2 as described below.

Figure 4:
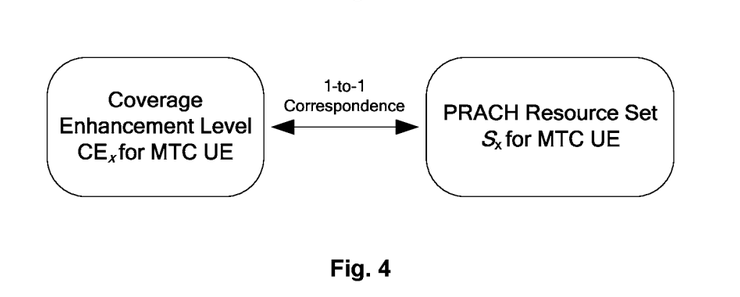
FIG. 4 is a schematic diagram showing a correspondence between a coverage enhancement level required for an MTC UE and the PRACH set used by the MTC UE.

Example 1: Let the PRACH resource set corresponding to the coverage enhancement level $CE_x$ be $S_x$ and define a unique correspondence between the PRACH resource set and the coverage enhancement level $CE_x$, where x=1, ..., M. Referring to FIG. 4, this correspondence is included in the RA configuration information for the MTC UE, provided by the base station to the MTC UEs in the cell or preconfigured in the MTC UE at manufacture. After receiving the RA configuration information for the MTC UE from the base station, the MTC UE selects an RA preamble sequence randomly based on the coverage enhancement level $CE_x$ calculated by the MTC UE itself, and uses the PRACH resource set $S_x$ to transmit the RA preamble sequence. The base station detects the preamble sequence from a set of candidate PRACH resource sets $S=\{S_1, ..., S_M\}$. Once the value of x has been detected, the base station can obtain the information on the coverage enhancement level required by the MTC UE attempting RA.

Example 2: In each cell, a coverage enhancement level corresponding to each RA preamble sequence is defined. Such correspondence is included in the RA configuration information for the MTC UE, provided by the base station to the MTC UEs in the cell or preconfigured in the MTC UE at manufacture. Once the base station detects the preamble sequence signature of the MTC UE, it obtains the coverage level information of the MTC UE.

Further, in the LTE network, the PRACH resource set configuration information $S_x$ (X=1, ..., M) for an MTC UE that requires additional coverage enhancement (including a low cost MTC UE or other UE running delay-tolerant MTC services and requiring coverage enhancement) in accordance with one of Examples 1~6 as described below.

Figure 5:
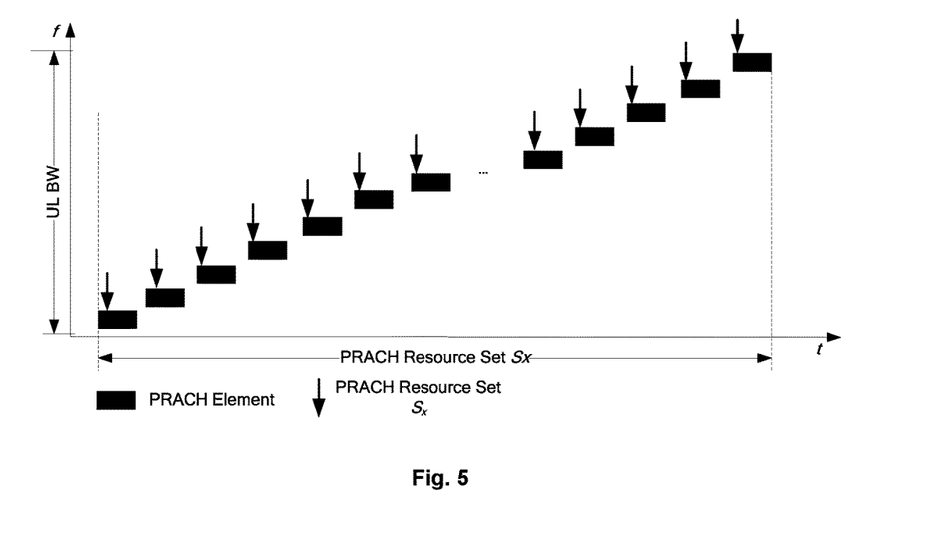
FIG. 5 is a schematic diagram showing a configuration of PRACH elements in a PRACH resource set $S_x$ for an MTC UE according to an embodiment of the present disclosure.

Example 1: The PRACH resource set for the MTC UE can include N PRACH elements, where N is a positive integer Example 2: In the PRACH resource set $S_x$ for the MTC UE, the PRACH elements can be transmitted in a frequency hopping manner. Such frequency hopping can achieve a diversity gain. Referring to FIG. 5, the duration period $t_x$ and the frequency hopping pattern of $S_x$ is included in the PRACH configuration information, broadcast by the base station to the MTC UE or preconfigured in the MTC UE at manufacture.

Figure 6:
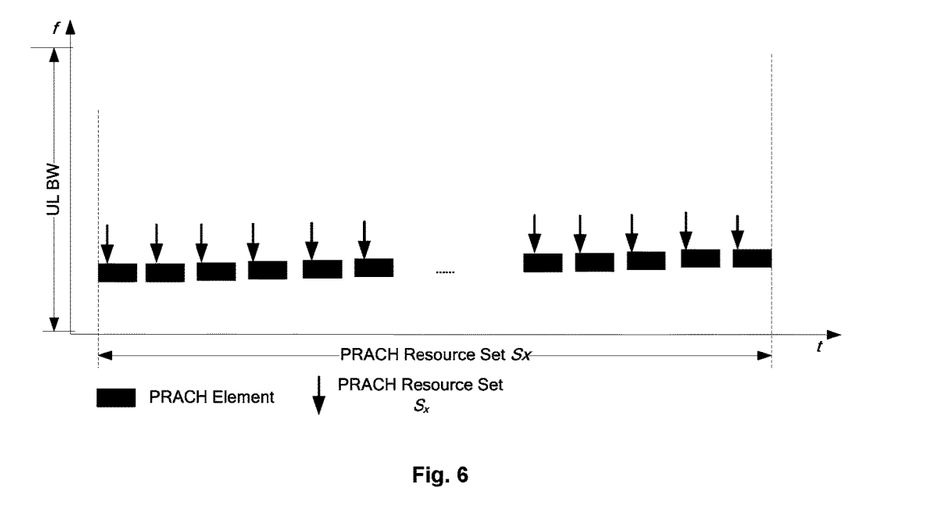
FIG. 6 is a schematic diagram showing a configuration of PRACH elements in a PRACH resource set $S_x$ for an MTC UE according to an embodiment of the present disclosure.

Example 3: In the PRACH resource set $S_x$ for the MTC UE, each PRACH element has a fixed position in frequency domain. Referring to FIG. 6, the duration period $t_x$ and the frequency hopping pattern of $S_x$ is included in the PRACH configuration information, broadcast by the base station to the MTC UE or preconfigured in the MTC UE at manufacture.

Figure 7:
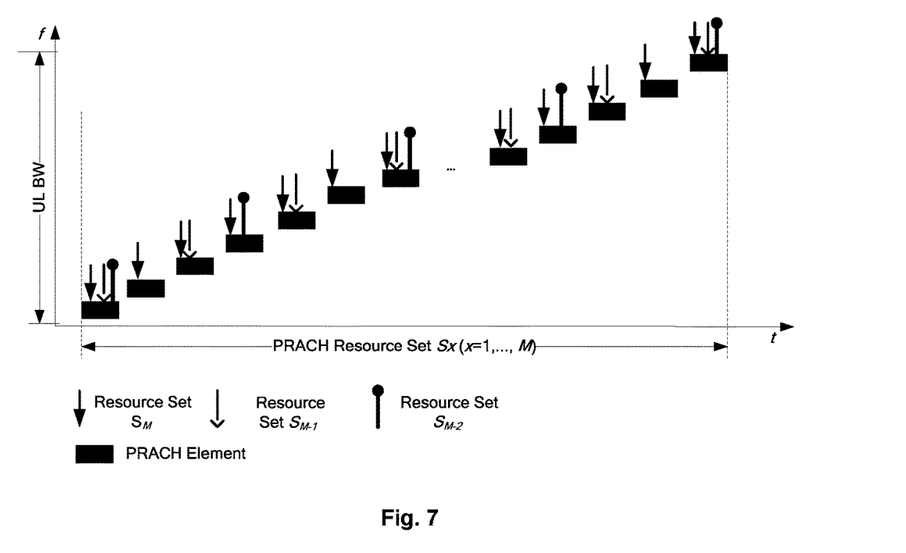
FIG. 7 is a schematic diagram showing a nested structure for a PRACH resource set $S_x$ according to an embodiment of the present disclosure.

Example 4: The duration period $t_x$ of the PRACH resource set $S_x$ for the MTC UE is the same for x=1, ..., M, i.e., $t_1=t_2=...=t_M$. FIG. 7 shows $t_1=t_2=...=t_M$.

Figure 8:
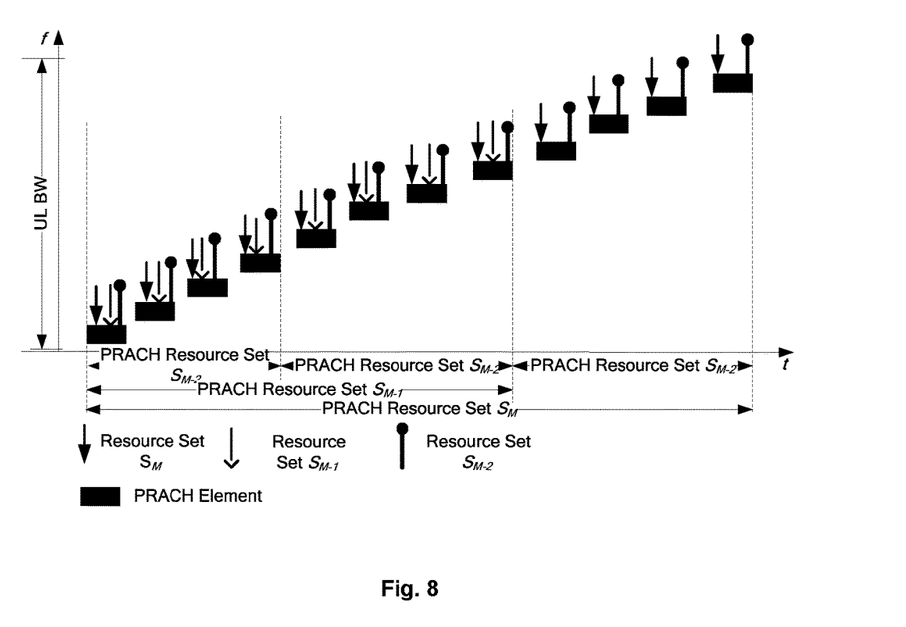
FIG. 8 is a schematic diagram showing a nested structure for a PRACH resource set $S_x$ according to an embodiment of the present disclosure.

Example 5: The duration period $t_x$ of the PRACH resource set $S_x$ for the MTC UE is different for x=1, ..., M, i.e., $t_1 \neq t_2 \neq ... \neq t_M$. FIG. 8 shows $t_1 < t_2 < ... < t_M$.

Example 6: The PRACH resource set $S_x$ for the MTC UE has a nested format, i.e., $S_1 \subset S_2 \subset ... \subset S_M$.

Finally, the method 100 ends at S1040.

Figure 11:
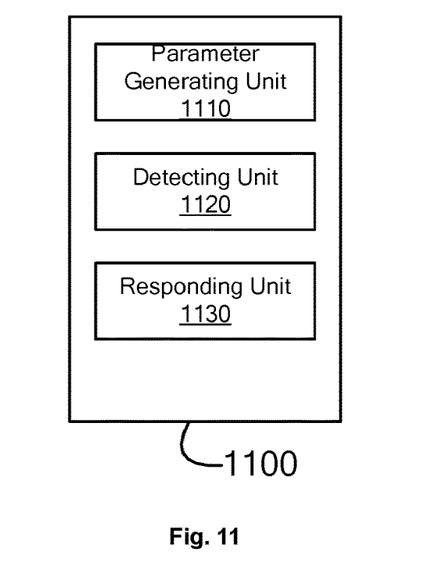
FIG. 11 is a block diagram of a base station according to an embodiment of the present disclosure.

FIG. 11 is a block diagram of a base station according to an embodiment of the present disclosure. As shown in FIG. 11, the base station 1100 includes a parameter generating unit 1110, a detecting unit 1120 and a responding unit 1130.

The parameter generating unit 1110 is configured to generate and transmit a Physical Random Access Channel (PRACH) configuration parameter for a User Equipment (UE). For example, the parameter generating unit 1110 can broadcast the PRACH configuration parameter for the UE over a physical layer broadcast channel in a serving cell, or in system information in accordance with a PRACH-ConfigSIB specification, or in mobility control information in accordance with a PRACH-Config specification, or in a System Information Block (SIB) or a Layer 2/Layer 3 message.

The detecting unit 1120 is configured to detect a random preamble sequence and/or a corresponding PRACH resource set transmitted from the UE, so as to determine a type and/or a coverage enhancement level of the UE. For example, the detecting unit 1120 can determine the type and/or the coverage enhancement level of the UE by detecting the random access preamble sequence transmitted from the UE in a pre-defined and/or pre-configured PRACH resource. Here the PRACH resource set corresponds to the coverage enhancement level of UE uniquely. Alternatively, the detecting unit 1120 can determine the type and/or the coverage enhancement level of the UE by detecting a random access preamble signature of the UE. Here the random access preamble signature of the UE corresponds to the coverage enhancement level of the UE.

The responding unit 1130 is configured to generate a Random Access Response (RAR) based on the type and/or the coverage enhancement level of the UE. For example, the RAR may include an uplink synchronization timing adjustment, a cell radio network temporary identifier, a Layer 2/Layer 3 uplink message grant, and the like.

Figure 12:
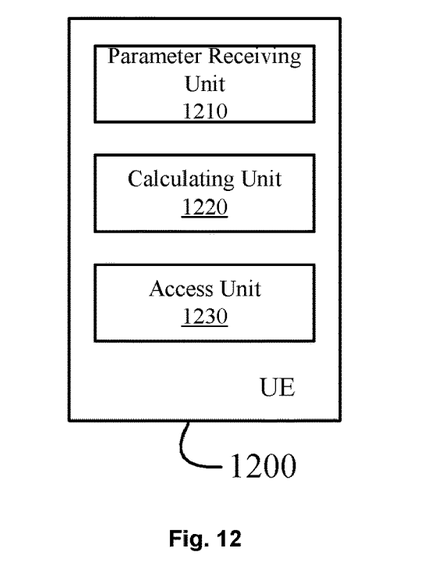
FIG. 12 is a block diagram of a UE according to an embodiment of the present disclosure.

FIG. 12 is a block diagram of a UE according to an embodiment of the present disclosure. As shown in FIG. 12, the UE 1200 includes a parameter receiving unit 1210, a calculating unit 1220 and an accessing unit 1230.

The parameter receiving unit 1210 is configured to receive a Physical Random Access Channel (PRACH) configuration parameter. The PRACH configuration parameter for the UE may include one or more of: a basic parameter for a PRACH preamble sequence, a random access scheme, a coverage enhancement level configuration of a cell, duration periods of PRACH resource sets required for UEs having different coverage enhance levels, a PRACH element configuration in the PRACH resource set, and a time window for the UE to detect the RAR.

The calculating unit 1220 is configured to calculate a coverage enhancement level of the UE. For example, the calculating unit 1220 can obtain from the PRACH configuration parameter a unique correspondence between the coverage enhancement level and a path loss and calculate the coverage enhancement level of the UE based on the path loss.

The accessing unit 1230 is configured to select a PRACH resource set and a random access preamble sequence for random access. For example, the accessing unit 1230 can select a random access preamble sequence based on the calculated coverage enhancement level and transmit the random access preamble sequence over the PRACH resource set corresponding to the calculated coverage enhancement level. Alternatively, the accessing unit 1230 can select a preamble sequence from preamble sequences for contention-based random access randomly and reuse the PRACH resource set corresponding to the preamble sequence.

With the mechanisms for transmitting the RA procedure information for the MTC UE in the serving cell, it is possible to allow the base station to transmit the RA procedure information for the serving cell and to allow the MTC UE to select the corresponding PRACH resource for RA. With the solutions according to the present disclosure, it is possible to increase resource utilization for LTE to support MTC UEs, improve frequency spectrum/energy efficiency, and reduce time/frequency resource conflicts between cells.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A method performed by an evolved node B (eNB), comprising:
   generating first information including a Physical Random Access Channel (PRACH) configuration;
   transmitting the first information
   generating a random access response based on (i) a coverage enhancement (CE) level and (ii) a device type of a User Equipment (UE); and
   transmitting the random access response to the UE, wherein
   the PRACH configuration includes second information used for determining the CE level based on a reference signal received power (RSRP),
   the CE level is determined from a plurality of CE levels,
   a plurality of PRACH resources are defined for the respective plurality of CE levels,
   one PRACH resource is chosen from the plurality of PRACH resources based on the determined CE level,
   a plurality of preamble groups are defined for the respective plurality of the CE levels, and
   one preamble group is chosen from the plurality of preamble groups based on the determined CE level.

2. The method of claim 1, wherein
   the plurality of preamble groups is constituted by four preamble groups, and
   the respective plurality of the CE levels is constituted by four CE levels.

3. A method performed by a User Equipment (UE), comprising:
   receiving first information including a Physical Random Access Channel (PRACH) configuration;
   computing a reference signal reception power (RSRP);
   choosing a PRACH resource;
   choosing one preamble group; and
   receiving a random access response generated based on (i) a coverage enhancement (CE) level and (ii) a device type of the UE, wherein, the PRACH configuration includes a second information used for determining the CE level based on the RSRP,
the CE level is determined from a plurality of CE levels,
a plurality of PRACH resources are defined for the respective plurality of the CE levels,
one PRACH resource is chosen from the plurality of PRACH resources based on the determined CE level,
a plurality of preamble groups are defined for the respective plurality of the CE levels, and
one preamble group is chosen from the plurality of preamble groups based on the determined CE level.

4. The method of claim 3, wherein
the plurality of preamble groups is constituted by four preamble groups, and
the respective plurality of the CE levels is constituted by four CE levels.

5. An evolved node B (eNB), comprising:
generation circuitry configured to generate first information including a Physical Random Access Channel (PRACH) configuration; and
transmission circuitry configured to transmit the first information, wherein
the PRACH configuration includes second information used for determining a coverage enhancement (CE) level based on a reference signal received power (RSRP),
the CE level is determined from a plurality of CE levels,
a plurality of PRACH resources are defined for the respective plurality of the CE levels,
one PRACH resource is chosen from the plurality of PRACH resources based on the determined CE level,
a plurality of preamble groups are defined for the respective plurality of the CE levels,
one preamble group is chosen from the plurality of preamble groups based on the determined CE level,
the generation circuitry is further configured to generate a random access response based on (i) the determined CE level and (ii) a device type of a User Equipment (UE), and
the transmission circuitry is further configured to transmit the random access response to the UE.

6. The eNB of claim 5, wherein
the plurality of preamble groups is constituted by four preamble groups, and
the respective plurality of the CE levels is constituted by four CE levels.

7. A User Equipment (UE), comprising:
reception circuitry configured to receive first information including a Physical Random Access Channel (PRACH) configuration; and
calculation circuitry configured to compute a reference signal reception power (RSRP) choose a PRACH resource, and choose one preamble group, wherein
the PRACH configuration includes second information used for determining a coverage enhancement (CE) level based on the RSRP,
the CE level is determined from a plurality of CE levels,
a plurality of PRACH resources are defined for the respective plurality of the CE levels,
one PRACH resource is chosen from the plurality of PRACH resources based on the determined CE level,
a plurality of preamble groups are defined for the respective plurality of the CE levels,
one preamble group is chosen from the plurality of preamble groups based on the determined CE level, and
the reception circuitry is further configured to receive a random access response generated based on (i) the determined CE level and (ii) a device type of the UE.

8. The UE of claim 7, wherein
the plurality of preamble groups is constituted by four preamble groups, and
the respective plurality of the CE levels is constituted by four CE levels.

* * * * *